US010393267B2

(12) United States Patent
Demeulenaere et al.

(10) Patent No.: US 10,393,267 B2
(45) Date of Patent: Aug. 27, 2019

(54) METAL-TO-METAL SEALING

(71) Applicant: Ford Global Technologies, LLC, Dearborn, MI (US)

(72) Inventors: Xavier Demeulenaere, London (GB); Mark Michel, Dartford (GB)

(73) Assignee: Ford Global Technologies, LLC, Dearborn, MI (US)

(*) Notice: Subject to any disclaimer, the term of this patent is extended or adjusted under 35 U.S.C. 154(b) by 85 days.

(21) Appl. No.: 15/486,165

(22) Filed: Apr. 12, 2017

(65) Prior Publication Data
US 2017/0299059 A1    Oct. 19, 2017

(30) Foreign Application Priority Data

Apr. 18, 2016 (GB) .................................. 1606733.2

(51) Int. Cl.
*F16J 15/04* (2006.01)
*F16L 25/00* (2006.01)
*F16J 15/08* (2006.01)

(52) U.S. Cl.
CPC .......... *F16J 15/04* (2013.01); *F16J 15/0881* (2013.01); *F16L 25/0018* (2013.01)

(58) Field of Classification Search
CPC ...... F16J 15/04; F16J 15/0081; F16L 25/0018
See application file for complete search history.

(56) References Cited

U.S. PATENT DOCUMENTS 3,403,717 A * 10/1968 Lemelson ............. B21K 25/00
277/641

6,123,339 A * 9/2000 Otsuji ..................... F16J 15/04
277/602

(Continued)

FOREIGN PATENT DOCUMENTS

CN          102032401 A      4/2011
DE   20201420102781 U1      8/2014
(Continued)

OTHER PUBLICATIONS

Intellectual Property Office of Great Britain, Combined Search and Examination Report Under Sections 17 and 18(3) Issued in Application No. GB1606733.2, dated Sep. 29, 2016, 4 pages.

*Primary Examiner* — Jacob M Amick
*Assistant Examiner* — Charles Brauch
(74) *Attorney, Agent, or Firm* — Julia Voutyras; McCoy Russell LLP

(57) ABSTRACT

Methods and systems for metal-to-metal sealing and, in particular, to the use of sintered parts to create metal-to-metal sealing joints is disclosed. In one example, a metal-to-metal sealing joint may comprise: a first mating surface and a second mating surface; wherein the first mating surface is formed on a first assembly having an annular projection with one or more annular grooves and the second mating surface is formed on a second assembly; wherein the projection is configured such that when the first and second surfaces are brought into mating contact, the annular projection on the first mating surface deforms the second mating surface to form a sealing joint. In this way, the metal-to-metal sealing joint between the first and second mating surfaces may minimize oil leakage between two assemblies, thereby improving engine fuel economy while simplifying part manufacturing.

20 Claims, 6 Drawing Sheets

(56) References Cited

U.S. PATENT DOCUMENTS

| | | | |
|---|---|---|---|
| 8,690,439 B2 | 4/2014 | Dickinger et al. | |
| 2010/0090410 A1* | 4/2010 | Doane | E21B 33/1212 |
| | | | 277/323 |
| 2013/0302560 A1* | 11/2013 | Chen | C03C 17/002 |
| | | | 428/138 |

FOREIGN PATENT DOCUMENTS

| | | | |
|---|---|---|---|
| EP | 0937934 A1 | | 8/1999 |
| JP | 2010164304 A | * | 7/2010 |
| JP | 2012082891 A | | 4/2012 |
| JP | 2013036505 A | | 2/2013 |
| KR | 20100059388 A | * | 6/2010 |
| KR | 20100059388 A | * | 6/2010 |
| WO | 2013163410 A1 | | 10/2013 |
| WO | 2014078783 A1 | | 5/2014 |

\* cited by examiner

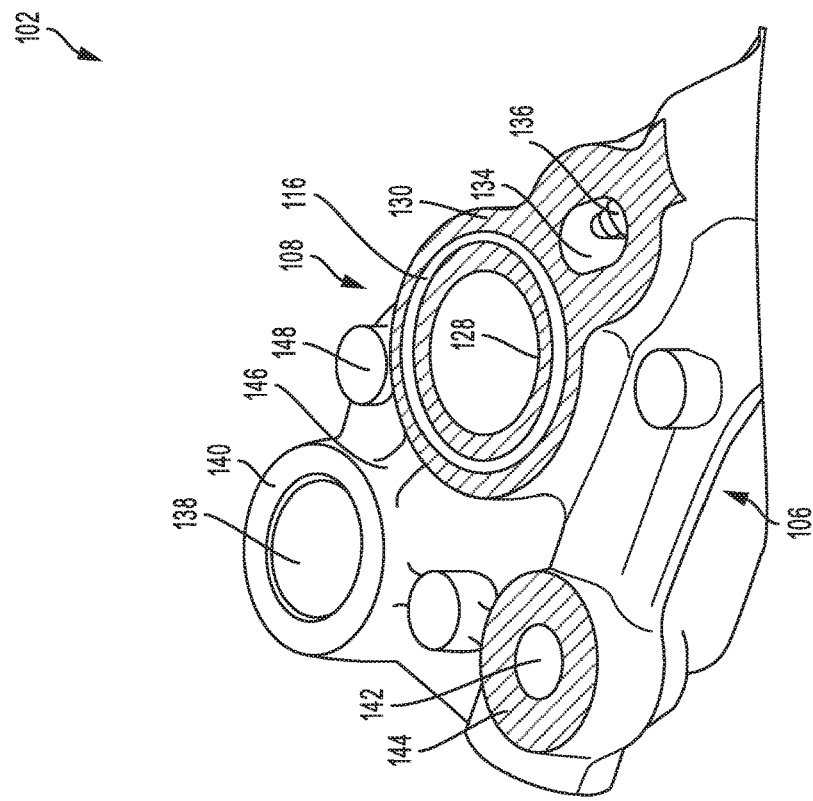
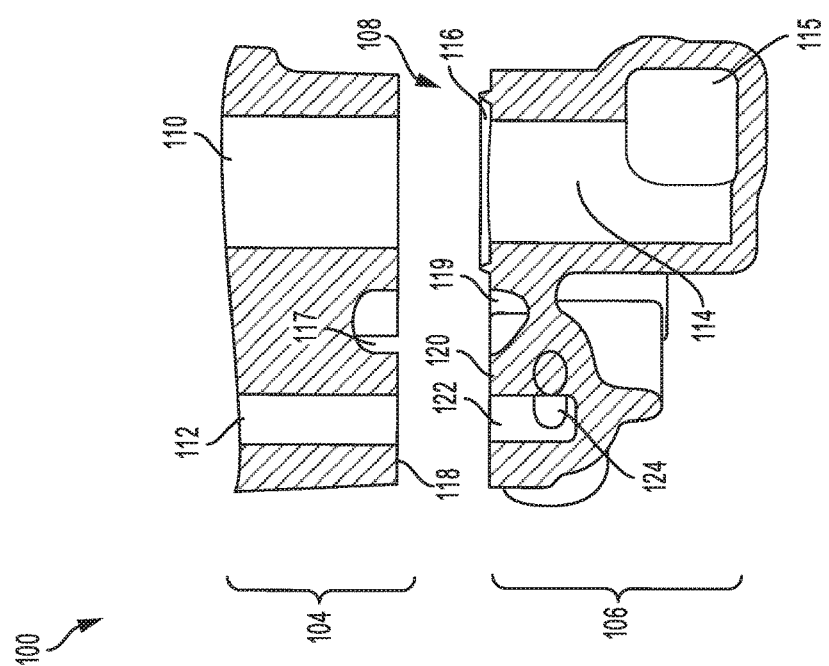
FIG. 1B
FIG. 1A

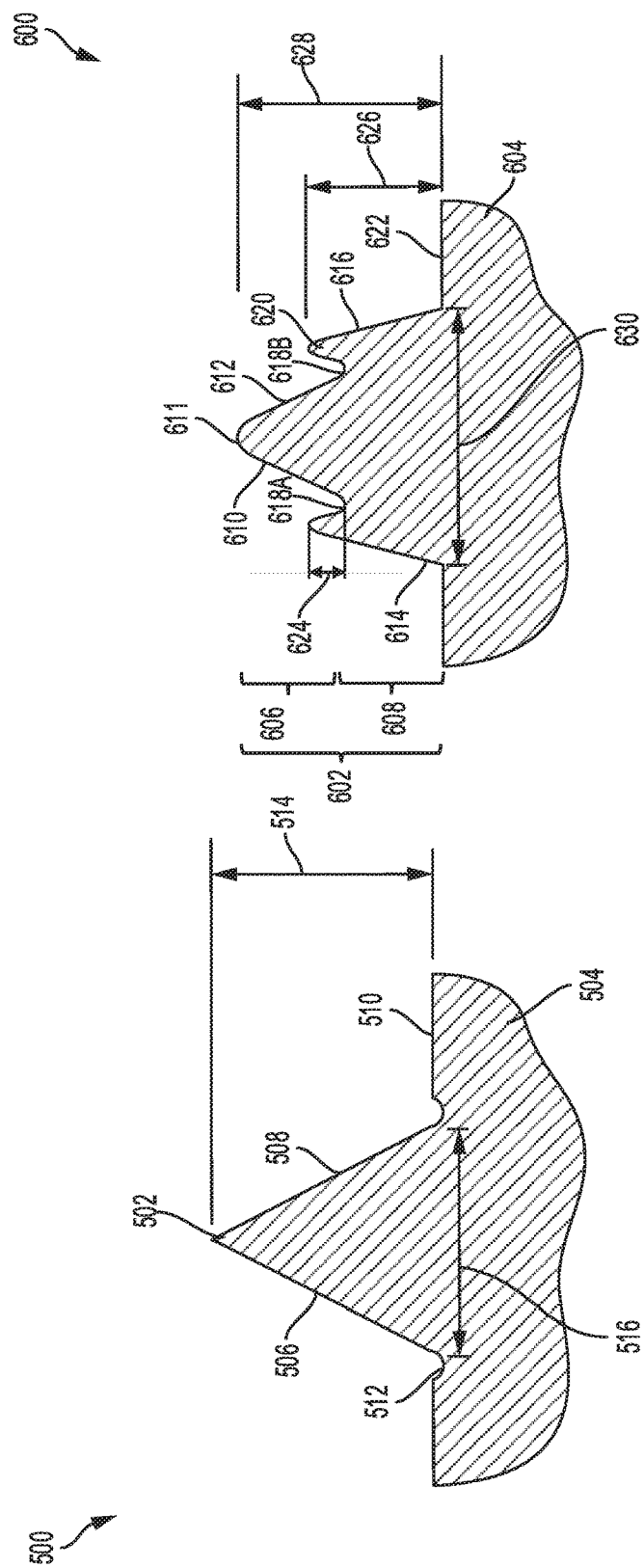

METAL-TO-METAL SEALING

CROSS REFERENCE TO RELATED APPLICATION

The present application claims priority to Great Britain Patent Application No. 1606733.2, filed on Apr. 18, 2016. The entire contents of the above-referenced application are hereby incorporated by reference in its entirety for all purposes.

FIELD

The present description relates generally to methods and systems for metal-to-metal sealing and, in particular, to the use of sintered parts to create metal-to-metal sealing joints.

BACKGROUND/SUMMARY

Metal-to-metal seals are deployed in various locations within automotive systems, typically for internal seals in parts of the system where there is some tolerance of imperfection, that is, where the seal may still perform its required function despite being less than 100% effective.

For example, oil connections in a lower end of an engine may still function effectively where seals are less than perfect, because oil escaping through these seals may drain back to an oil sump. Although the oil may safely drain back to the oil sump and therefore the engine can continue to run, the fuel consumption of the engine and pumping requirements may increase. Thus improving sealing efficiency throughout the engine may improve fuel economy and promote better engine performance.

In other parts of the engine, where the integrity of sealing is important for adequate engine performance and/or the user's perception of the quality of the engine, seals are implemented using rubber O-rings, liquid sealants such as room temperature vulcanizing rubbers or gaskets. However, these solutions are not universally applicable because of the additional parts, costs and manufacture steps.

In one example, the issues described above may be addressed by a metal-to-metal seal comprising: a first mating surface and a second mating surface; wherein the first mating surface is provided with an annular projection having one or more annular grooves and wherein the projection is configured such that when the first and second mating surfaces are brought into mating contact, the annular projection of the first mating surface deforms the second mating surface to form a sealing joint. In this way, an adequate sealing interface is formed between the first and second mating surface, thereby reducing or minimizing leakage between the surfaces.

As one example, the metal-to-metal sealing joint may be formed by deforming a projection on a first assembly via a mating surface of a second assembly brought into mating contact with the first assembly, displaced material from the deformed projection being retained in one or more grooves of the first or second assembly to form a tight sealing joint. The metal-to-metal sealing joint between the first and second assembly may confer several advantages. For example, the sealing joint may reduce or minimize fuel or engine oil leakage between the first and second assembly while obviating the need for additional sealants such as sealing liquids or gaskets. In this case, the reduced oil leakage between the assemblies may reduce operation requirements for the oil pump while promoting better engine fuel economy. In another example, the projection on the first assembly may be formed using a sintering process, thereby obviating the need for additional machining of the assembly after manufacture. In this way, the metal-to-metal sealing joint formed between the first and second assembly may minimize oil leakage between the assemblies to improve engine fuel economy while simplifying manufacturing of each assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1A shows a cross section view of a sealing joint between a ladder frame and an oil pump.

FIG. 1B shows a third dimensional view of the sealing joint on the oil pump.

FIG. 5 shows a cross sectional view of an alternative embodiment of a projection having a narrow peak and grooves on a base portion of the projection.

FIG. 6 shows a cross sectional view of an alternative embodiment of a projection having a broad primary peak and a plurality of secondary peaks.

FIGS. 1A-7 are shown approximately to scale, although other relative dimensions may be used, if desired.

DETAILED DESCRIPTION

Figure 2A:
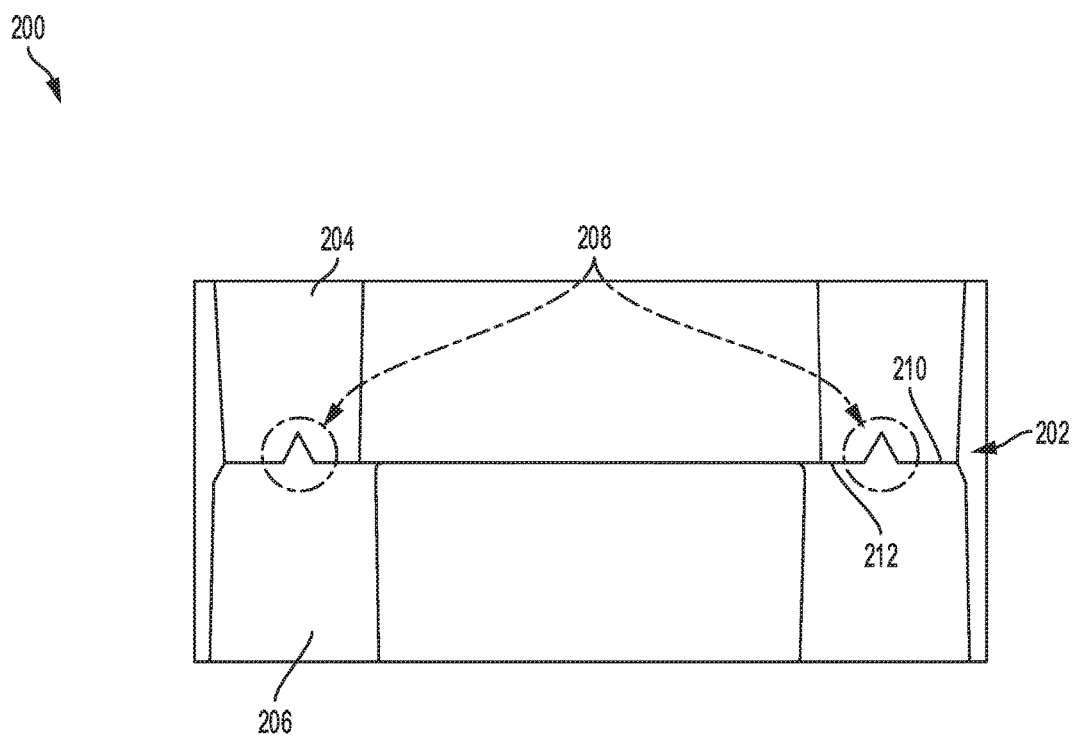
FIG. 2A shows a cross section view of a sealing joint between a first assembly and a second assembly.
Figure 2B:
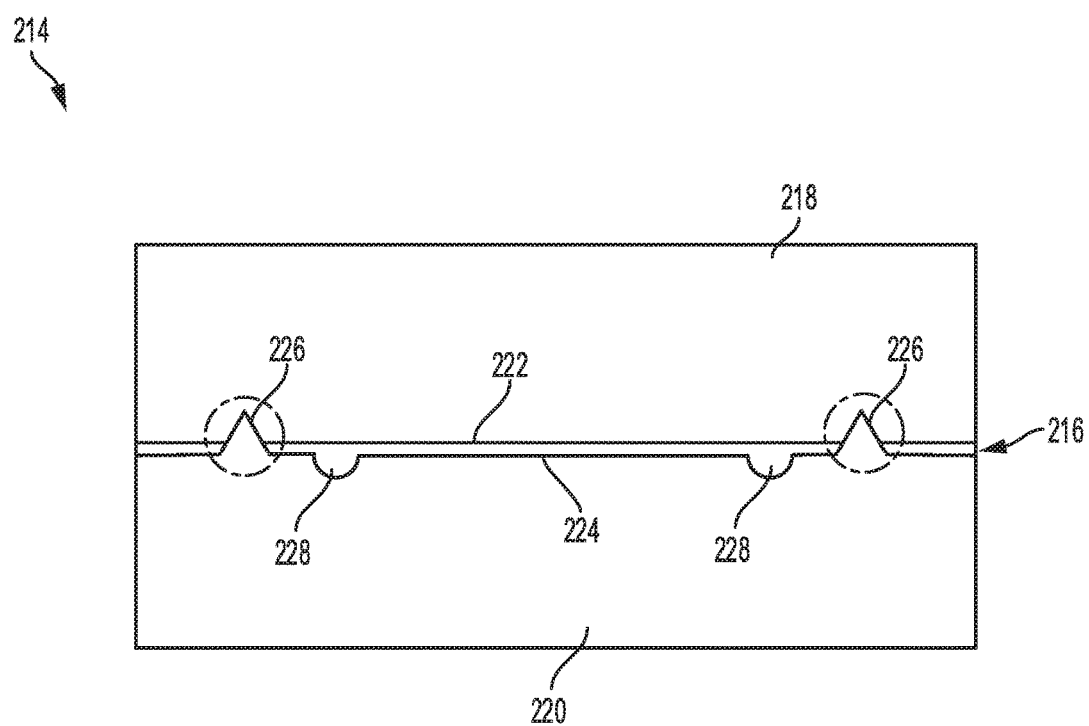
FIG. 2B shows an alternative cross section view of a sealing joint between a ladder frame and an oil pump.

The following description relates to systems and methods for metal-to-metal sealing and, in particular, to the use of sintered parts to create metal-to-metal seals. FIG. 1A shows a cross section view of a sealing joint between a ladder frame and an oil pump. When brought into face sharing contact, an annular projection on the oil pump may be deformed by a mating surface of the ladder frame to form a sealing joint that adequately couples the oil pump to ladder frame while minimizing flow leakage at the sealing joint. FIG. 1B shows a three dimensional view of a sealing joint on an oil pump. Although shown as a circular section in FIG. 1B, the annular projection of the sealing joint on the oil pump may have other shapes and dimensions. A cross section view of an annular projection on a mating surface of a first assembly brought into face contact with a mating surface of a second assembly is shown in FIG. 2A. The annular projection formed on the mating surface of the second assembly, may be an upward projecting portion having an adequate height, the projection adapted to deform when brought into face contact with the mating surface of the first assembly. An alternative cross section view of a sealing joint between a ladder frame and an oil pump is shown in FIG. 2B. An annular projection formed on a mating surface of the oil pump may have an adequate height that deforms when brought into face contact with a mating surface of the ladder frame. As an example, the annular projection of the mating surface of the oil pump may have various shapes and dimensions, as disclosed below with reference to FIGS. 3-7.

As an example, a metal-to-metal sealing joint may comprise: a first mating surface and a second mating surface; wherein the first mating surface is provided with an annular projection having one or more annular grooves and wherein the projection is configured such that when the first and second mating surface are brought into mating contact, the annular projection of the first mating surface deforms the second mating surface to form a sealing joint. For example, the provision of the annular projection may result in the provision of an annular seal, thereby preventing fluid bypassing the sealing joint. In another example, the provision of the annular projection on the first mating surface that deforms the second mating surface to provide the sealing joint obviates the need of additional parts such as gaskets, liquid sealant etc. In a further example, the provision of the sealing joint by the deformation of the second mating surface also provides the advantage that the second mating surface does not have to be provided with a specific form or shape to enable mating, because it is deformed by the projection on the first mating surface.

Each groove on the first mating surface may provide a location into which the material of the second mating surface may collect, when the first and second mating surfaces are brought into mating contact. Furthermore, the topology complicates the path that may be followed by a fluid in order to break the seal, i.e. to move from one side of the seal to the other. The first mating surface may be fabricated from a harder material than the second mating surface. For example the first mating surface may be fabricated from steel and the second mating surface may be fabricated from aluminum. More generally the first mating surface can be formed from a hard ferrous material, whilst the second mating surface may be formed from a lightweight metal, such as aluminum.

The first mating surface may be a sintered part, for example. The provision of a sintered part simplifies the manufacture of the parts because the entire first mating surface can be provided as a single piece, rather than applying the projection subsequent to the forming of the first mating surface or machining the part to create the projection. As an example, the projection may have a substantially triangular cross section. An isosceles triangular cross section is the simplest shape for the projection and has the advantages that it is uncomplicated to sinter and provides a good pressure distribution, when the two surfaces are brought into mating contact. In one example, the triangular cross section of the projection may be modified by a curved tip. The curved tip reduces the initial pressure as the two mating surfaces are brought into mating contact, thereby reducing the risk of cracking the second mating surface.

The annular groove may be provided below or above the level of the first mating surface. When the groove is provided above the level of the first mating surface, it modifies the triangular cross section of the projection. Further, the projection may be provided with an asymmetric cross section which provides a larger angle between the first mating surface and the projection at one side in comparison with an angle at the other side of the projection. An asymmetric profile may be advantageous if there is a considerable difference in pressure of the fluids on either side of the seal. As an example, the projection may have a height exceeding 1.0 mm. More particularly, the projection may have a height in the region of 1.0 mm to 5.0 mm. In another example, the projection may have a height of 3.0 mm to 4.0 mm.

In further examples, the projection having a height in a range of 3.0 mm to 5.0 mm may be more appropriate where the two mating surfaces are provided in the same material. Under these circumstances, when two assemblies are clamped together, a first and a second mating surface of the first and second assemblies, respectively may deform to reduce the height of the projection, and where the second mating surface may deform to provide a groove. In order to have the required final height, after both assemblies have been brought into mating contact, the projection must be provided with a greater initial height than is required if the second mating surface is fabricated from a less hard material. In one example, the first mating surface may be fabricated from steel or any similar hard ferrous material while the second mating surface may be fabricated from aluminum or any similar lightweight material.

Turning to FIG. 1A, a cross sectional view 100 of a metal-to-metal sealing joint 108 provided between a ladder frame 104 and an oil pump 106 is disclosed. In this example, the ladder frame 104 may form a first assembly while the oil pump 106 may form a second assembly, both assemblies brought into face sharing contact to form the sealing joint 108.

The sealing joint 108 may be formed when an annular projection 116 on a second mating surface 120 of the oil pump 106 is brought into face sharing contact with a first mating surface 118 of the ladder frame 104. The contact pressure between the mating surfaces 118-120 causes a portion of the ladder frame 104 to deform, thereby allowing one or more grooves on the mating surface of ladder frame or besides the annular projection 116 on the first mating surface to accommodate a portion of the projection 116, thereby forming the sealing joint 108. When the sealing joint 108 is formed between the ladder frame 104 and oil pump 106, an oil outlet channel 114 in the oil pump 106 may align with an oil inlet channel 110 in the ladder frame 104 to allow flow of engine oil from the pump to the ladder frame. The oil outlet channel 114 in the oil pump 106 may include a side pocket 115. Similarly, a first flow channel 112 in the ladder frame 104 may be fluidly connected to a second flow channel 122, when the ladder frame 104 is coupled to the oil pump 106 via the sealing joint 108. The second flow channel 122 may include an internal slot 124. When the first and second mating surface 118-120 make face contact, an aperture 117 in the ladder frame 104 may overlap with an aperture 119 in the oil pump 106 to form a circular enclosure.

Although the annular projection 116 may be shown as having circular shape, the projection may have other shapes. For example, the shape of the annular projection 116 may depend on shapes of components or assemblies to be sealed. In one example, the annular projection 116 may have an elliptical or an irregular shape. In alternative examples, the annular projection 116 may take any form of a regular or irregular polygon. In further examples, the annular projection 116 may have a shape of any of a square, pentagon, hexagon or combination of any of the regular or irregular polygons. Although FIG. 1A shows the sealing joint 108 formed between the ladder frame 104 and oil pump 106, the sealing joint 108 may also be formed between an oil pump body and oil cooler adaptor, for example. In other examples, the sealing joint 108 may be formed between a first assembly and a second assembly, where the first assembly may be a first engine component and the second assembly may be a second engine component, such as for oil connections in a lower end of the engine. In this way, a metal-to-metal sealing joint may be formed between the first and second assembly to minimize fluid leakage between mating surfaces of the two assemblies without introducing additional sealants while simplifying manufacturing of each assembly.

Referring to FIG. 1B, a three dimensional view 102 of a metal-to-metal sealing joint 108 having an annular projection 116 on an outer surface 130 of a first opening 128 in the oil pump 106 is disclosed. The oil pump 106 may also include an aperture 134 having a component 136, a second opening 138 and a third opening 142. A plurality of rib elements 146 and cylindrical elements 148 may be formed adjacent to each of the first, second and third openings to provide rigidity to the oil pump body. For example, one or more rib elements 146 may connect to outer portions of each of the first, second and third openings to provide structural integrity to the oil pump 106.

As shown in FIG. 1B, the projection 116 formed on the outer surface 130 of the first opening 128, may be an upward projecting portion with an adequate thickness and height. For example the thickness and height of the projection 116 may range from 1.0 mm to 5.0 mm. Although shown as a pointed annular element, the projection 116 may have other regular or irregular shapes and dimensions. When brought into face contact with a corresponding portion of an assembly (such as the ladder frame 104 shown in FIG. 1A) that couples to the oil pump 106, the projection 116 on outer surface 130 of the oil pump 106 may deform to form a sealing joint between the assembly and the oil pump. Although shown without a projection, each outer surface 140 and 144 of the second opening 138 and third opening 142, respectively may have a projection adapted to deform when brought into face contact with each corresponding portion of the assembly coupled to the oil pump 106 to form sealing joints at each of the second and third openings. In this way, the oil pump 106 may be configured with one or more metal-to-metal sealing joints that allow each of the first, second and third openings in the oil pump to fluidly couple to corresponding openings in an assembly coupled to the oil pump while minimizing fluid leakage at any of the openings.

Referring to FIG. 2A, a cross section 200 through a sealing joint 202 of a first assembly 204 and a second assembly 206 is disclosed. The first and second assemblies may have a first mating surface 210 and a second mating surface 212, respectively.

The first mating surface 210 may be machined to provide a smooth surface to minimize leakage arising from surface roughness of the first assembly 204. Alternatively, the first assembly 204 may be manufactured using a sintering process, thereby obviating the need for machining the first mating surface 210. In this case, the first mating surface 210 of the first assembly may have a smooth surface that mates with the second surface 212 of the second assembly 206 having the projection 208 to form a sealing joint that reduces or minimizes leakage at an interface between the two assemblies.

The annular projection 208 on the second mating surface 212 may have a triangular cross section. However, in alternative examples, the annular projection 208 may have other regular or irregular shapes, such as a square, pentagon, hexagon or a combination of regular and irregular shapes. The second mating surface 212 may be provided on a sintered component, such that the projection 208 is formed integrally on the second assembly 206 without any additional machining or finishing process. The second assembly 206 may be fabricated from a harder material than the first assembly 204. For example the second assembly 206 may be fabricated from steel while the first assembly 204 may be fabricated from aluminum. More generally the second assembly 206 may be formed from a hard ferrous material, whilst the first assembly 204 may be formed from a lightweight metal, such as aluminum or other suitable material.

The first and second assemblies 204-206 may be brought into face sharing contact by applying pressure on both assemblies (in a perpendicular direction to both assemblies) to form the sealing joint 202. The projection 208 on the second assembly 206, may deform when a smooth portion of the first mating surface 210 makes face-sharing contact with the second mating surface 212, to form the sealing joint 202. In this way, a metal-to-metal sealing joint 202 may be formed between a first and second assembly to minimize fluid leakage at the sealing joint without introducing additional sealing components such as gaskets or other sealants.

Turning now to FIG. 2B, a cross section view 214 through a sealing joint 216 of a ladder frame 218 and an oil pump 220 is disclosed. The ladder frame 218 and oil pump 220 may have a first mating surface 222 and a second mating surface 224, respectively. The second mating surface 224 of the oil pump 220 may include an annular projection 226 and a plurality of grooves 228.

The first mating surface 222 may be machined to provide a smooth surface that minimizes leakage arising from surface roughness of the ladder frame 218. The first mating surface 222 of the ladder frame 218 may be brought into mating contact with the second surface 224 of the oil pump 220 to allow the annular projection 226 to deform, thereby forming the sealing joint 216 that minimizes leakage at an interface between the ladder frame 218 and oil pump 220. The grooves 228 may be adequately sized to receive portions of the deformed first mating surface 222 of the ladder frame 218 or a portion of the deformed annular projection 226.

The annular projection 226 on the second mating surface 224 may have a triangular cross section, however, alternative shapes such as a square, pentagon, hexagon or a combination of regular and irregular shapes, may be considered. The second mating surface 224 may be provided on a sintered component, such that the projection 226 is formed integrally on the oil pump without any additional machining or finishing process. The oil pump 220 may be fabricated from a harder material than the ladder frame 218. For example, the oil pump 220 may be fabricated from steel while the ladder frame 218 may be fabricated from aluminum. More generally the oil pump 220 may be formed from a hard ferrous material, whilst the ladder frame 218 may be formed from a lightweight metal, such as aluminum or other suitable material.

The ladder frame 218 and oil pump 220 may be brought into face sharing contact by applying pressure in a perpendicular direction to both the ladder frame and oil pump to form the sealing joint 216. The projection 226 on the oil pump 220, may deform when a smooth portion of the first mating surface 222 of the ladder frame 218 makes face-sharing contact with the second mating surface 224 of the oil pump 220 to form the sealing joint 216. In this way, a metal-to-metal sealing joint 216 may be formed between the ladder frame 218 and oil pump 220 to minimize oil leakage at the sealing joint 216 without introducing additional sealing components such as gaskets or other sealants.

Figure 3:
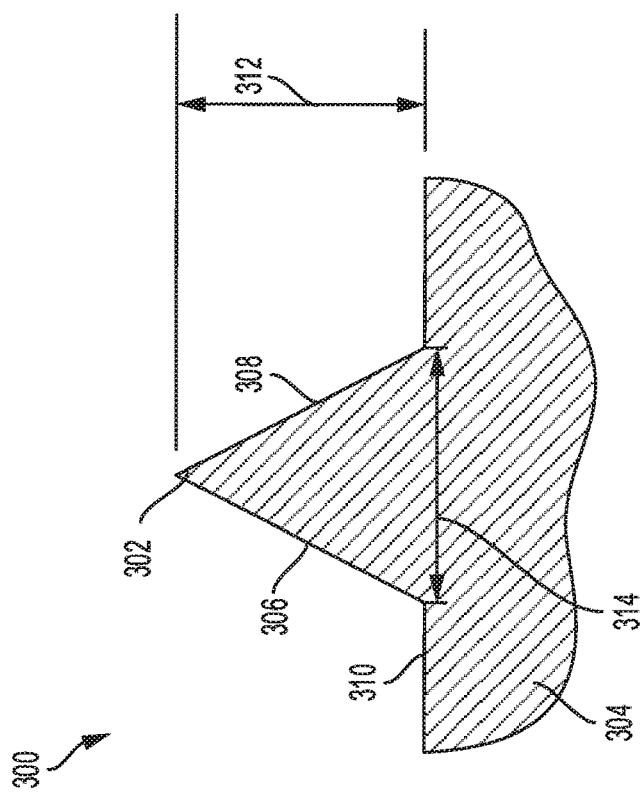
FIG. 3 shows a cross sectional view of an embodiment of a projection for a sealing joint.

Referring to FIG. 3, a cross sectional view of an embodiment of a projection 300 for a sealing joint (such as sealing joint 202 disclosed in FIG. 2A) is disclosed. The projection 300 includes an elevated portion 302 and a base portion 304.

The elevated portion 302 may be connected to the base portion 304 to form a single continuous component of an assembly.

As shown in FIG. 3, the projection 300 may have a first slanting edge 306 that connects to a second slanting edge 308 to form the elevated portion 302 coupled to the base portion 304 having side edges 310. As an example, the side edges 310 on the base portion 304 may form a mating surface of an assembly, such as the mating surface 212 of assembly 206 shown in FIG. 2A. The elevated portion 302 may have a triangular shape with a height 312 and a width 314. The elevated portion 302 may form an isosceles triangle, for example. In other examples, the elevated portion 302 may form other types of triangles, such as an equilateral triangle, a scalene triangle etc. The height 312 of the elevated portion 302 of the projection 300 may exceed 1.0 mm, for example. In other examples, the height 312 may be 3.0 mm, 4.0 mm or 5.0 mm. In cases where the height of the projection exceeds 10 mm, excessively high pressures may be required to deform such a projection to form a sealing joint, rendering the process impractical. Also, excessive pressures may be undesirable, especially if the applied pressure compromises the integrity of the mating assemblies during formation of the sealing joint. The base width 314 of the elevated portion 302 of the projection 300 may range from 1.0 mm to 5.0 mm, for example. In other examples, the base width 314 of the elevated portion 302 may range from 3.0 mm to 5.0 mm. In alternative examples, the base width 314 of the elevated portion 302 of the projection 300 may be 3.0 mm or 4.0 mm or 5.0 mm. A threshold ratio of the height 312 to the base width 314 may be 1.0, although the ratio may be less or greater than 1.0. However, the threshold ratio may not exceed 10 or be less than 0.1 because such extreme shapes may be difficult to sinter. The elevated portion 302 and base portion 304 may form part of an outer surface of a sealing interface of an assembly manufactured using a sintering process. In this case, both the elevated portion 302 and base portion 304 may be formed during manufacturing of the assembly, thereby obviating the need for forming the projection 300 after the assembly is manufactured. For example, the projection 300 may be comprised of a material such as aluminum, aluminum alloys, iron, steel and other ferrous alloys. In this way, the elevated portion 302 of the projection 300 may have range of dimensions depending on type of assembly and material used for the projection 300 and the degree of sealing required.

Figure 4:
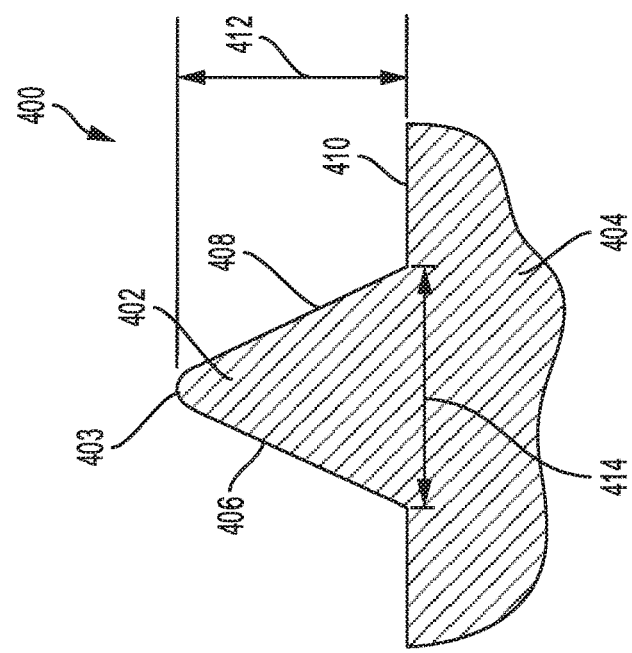
FIG. 4 shows a cross sectional view of an alternative embodiment of a projection having a broad peak.

Referring to FIG. 4, a cross sectional view of an alternative embodiment of a projection 400 for a sealing joint is disclosed. The projection 400 includes an elevated portion 402 and a base portion 404. The elevated portion 402 of the projection 400 may have dimensions adequately sized depending on a type of assemblies to be sealed, material of the projection and degree of sealing required. The elevated portion 402 of the projection 400 may include a curved tip 403. For example, the curved tip 403 may beneficial on mating surface of an assembly that is prone to failure by brittle fracture. In this case, the curved tip 403 of the elevated portion 402 may decrease initial pressure exerted on the mating surface.

As shown in FIG. 4, the projection 400 may have a first slanting edge 406 that connects to a second slanting edge 408 to form the elevated portion 402 coupled to the base portion 404 having side edges 410. As an example, the side edges 410 may form a mating surface of an assembly, such as the mating surface 212 of the assembly 206 shown in FIG. 2A. The elevated portion 402 may have a triangular shape with a tapered peak, a height 412 and a width 414. As an example, the height 412 of the elevated portion 402 may exceed 1.0 mm. In other examples, the height 412 of the elevated portion 402 may be 3.0 mm, 4.0 mm or 5.0 mm.

The base width 414 of the elevated portion 402 of the projection 400 may range from 1.0 mm to 5.0 mm, for example. In other examples, the base width 414 of the elevated portion 402 may range from 3.0 mm to 5.0 mm. In alternative examples, the base width 414 of the elevated portion 402 of the projection 400 may be 3.0 mm or 4.0 mm or 5.0 mm. A threshold ratio of the height 412 to the base width 414 may range from 0.5 to 1.0, although other ranges may apply. The dimensions of the projection 400 may be selected based on type of assembly and material of the projection 400. For example, the projection 400 may be comprised of a material such as aluminum, iron, steel and other ferrous alloys. In this way, the elevated portion 402 of the projection 400 may have range of dimensions depending on type of assembly and material used for the projection 400 and degree of sealing required.

Referring to FIG. 5, a cross sectional view of an alternative embodiment of a projection 500 for a sealing joint is disclosed. The projection 500 includes an elevated portion 502 and a base portion 504. The elevated peak 502 of the projection 500 may have a first slanting edge 506 that connects to a second slanting edge 508 to form the elevated portion 502 coupled to the base portion 504 having side edges 510. As an example, the side edges 510 may form a mating surface of an assembly, such as the mating surface 212 of the assembly 206 shown in FIG. 2A. The elevated portion 502 may have a triangular shape with a tapered peak, for example. The elevated portion 502 of the projection 500 may have dimensions adequately sized depending on a type of assemblies to be sealed, material of the projection and degree of sealing required.

As shown in FIG. 5, the projection 500 may include a plurality of grooves 512, one groove on either side of the projection. The grooves 512 may be adequately sized to collect displaced material when the projection 500 is brought into face contact with a mating surface of an assembly, thereby providing a sealing joint with a more tortuous path for fluid. The grooves 512 may be provided along the circumferential surface of the annular projection, for example. In alternative examples, the grooves may be provided discontinuously along the periphery of the projection. Although shown as a symmetrical configuration, the grooves 512 may have an asymmetrical configuration. In other examples, a single groove 512 may be provided on one side of the projection 500.

The elevated portion 502 may have a height 514 and a width 516, for example. In one example, the height 514 of the elevated portion 502 may exceed 1.0 mm. In other examples, the height 514 of the elevated portion may be 3.0 mm, 4.0 mm or 5.0 mm. In further examples, the height 514 of the elevated portion may range from 1.0 mm to 5.0 mm.

The base width 516 of the elevated portion 502 of the projection 500 may range from 1.0 mm to 5.0 mm, for example. In other examples, the base width 516 of the elevated portion 502 may range from 3.0 mm to 5.0 mm. In alternative examples, the base width 516 of the elevated portion 502 of the projection 500 may be 3.0 mm or 4.0 mm or 5.0 mm. A threshold ratio of the height 514 to the base width 516 may range from 0.5 to 1.0, although other ranges may apply. The dimensions of the projection 500 may be selected based on type of assembly and material of the projection 500. For example, the projection 500 may be comprised of a material such as aluminum, iron, steel and other ferrous alloys. In this way, the elevated portion 502 of the projection 500 may have range of dimensions depending on type of assembly and material used for the projection 500 and degree of sealing required.

Referring to FIG. 6, a cross sectional view of an alternative embodiment of a projection 600 for a sealing joint is disclosed. The projection 600 includes an elevated portion 602 and a base portion 604. The elevated portion 602 of the projection 600 may include a first section 606 and a second section 608, the first section 606 having a smaller cross sectional area compared to the second section 608. As an example, the first section 606 may have a first slanting edge 610 that connects to a second slanting edge 612 to form a broad peak 611. The second section 608 may have a first slanting edge 614 that connects to a first curved groove 618A, and a second slanting edge 616 that connects to a second curved groove 618B. A secondary peak 620 may be formed adjacent to each of the first and second curved grooves 618A-618B. The first section 606 and second section 608 may be a single continuous projection coupled to the base portion 604 having side edges 622. As an example, the side edges of the projection 600 may form a mating surface of an assembly, such as the mating surface 212 of the assembly 206 shown in FIG. 2A.

As shown in FIG. 6, each of the first and second curved grooves 618A-618B of the projection 600 may have a depth 624, adequately sized to receive displaced material when the projection 600 is brought into face contact with a mating surface of an assembly (different from the assembly having the projection 600), thereby providing a sealing joint with a conduit for fluid flow, for example. In one example, the depth 624 of each of the first and second grooves 618A-618B may range from 0.01 mm to 2.0 mm. Although shown as having similar heights, each of the first and second grooves 618A-618B may have different heights, thereby forming a projection that is asymmetrically shaped.

The second section 608 may have a height 626 smaller than a projection height 628. As an example, the height 626 of the second section 608 may be 1.5 mm and projection height 628 may be 3.0 mm. In other examples, the height 626 of the second section 608 may range from 0.5 mm to 3.5 mm. In further examples, the projection height 628 may range from 1.0 mm to 5.0 mm.

A base width 630 of the elevated portion 602 of the projection 600 may range from 1.0 mm to 5.0 mm, for example. In other examples, the base width 630 of the elevated portion 602 may range from 3.0 mm to 5.0 mm. In alternative examples, the base width 630 of the elevated portion 602 of the projection 600 may be 3.0 mm or 4.0 mm or 5.0 mm. A threshold ratio of the projection height 628 to the base width 630 may range from 0.5 to 1.0, although other ranges may apply. The dimensions of the projection 600 may be selected based on type of assembly and material of the projection 600. For example, the projection 600 may be comprised of a material such as aluminum, aluminum alloys, iron, steel and other ferrous materials. In this way, the elevated portion 602 of the projection 600 may have various dimensions depending on type of assembly and material used for the projection 600, and degree of sealing required.

Figure 7:
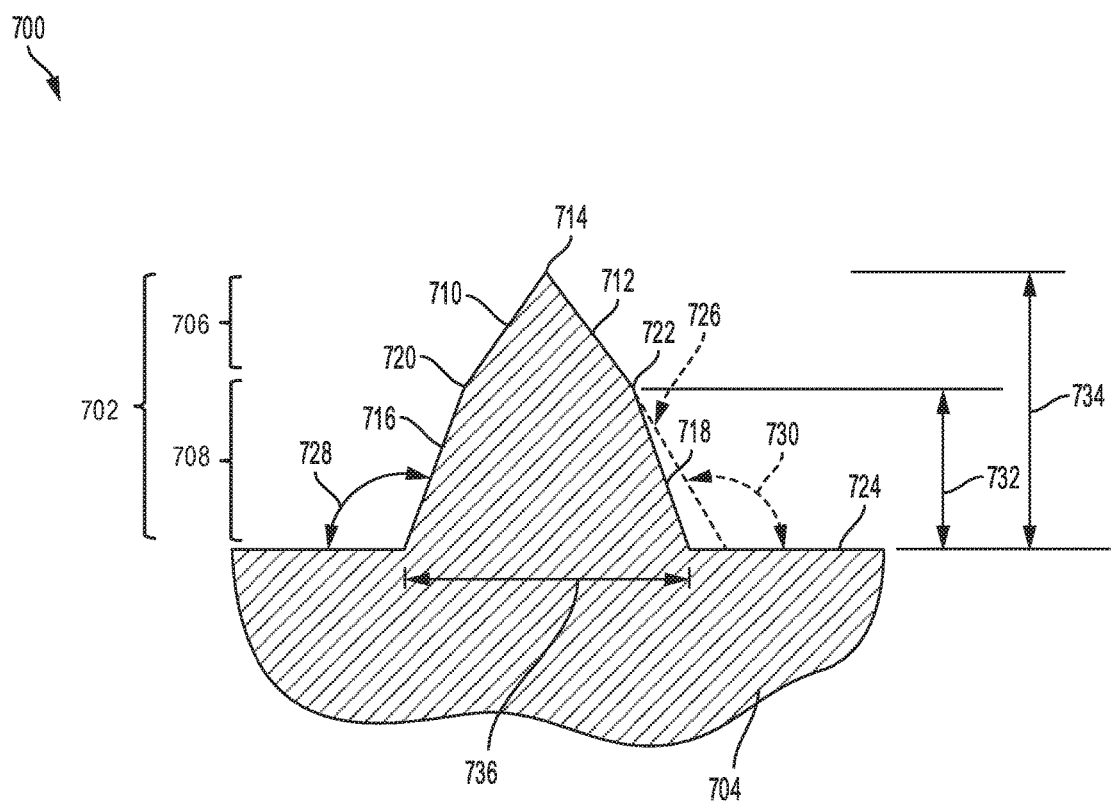
FIG. 7 shows a cross sectional view of an alternative embodiment of a projection having a tapered peak.

Referring to FIG. 7, a cross sectional view of an alternative embodiment of a projection 700 for a sealing joint is disclosed. The projection 700 includes an elevated portion 702 and a base portion 704. The elevated portion 702 of the projection 700 may include a first section 706 and a second section 708, the first section 706 having a smaller cross sectional area compared to the second section 708. As an example, the first section 706 may have a first slanting edge 710 that connects to a second slanting edge 712 to form a narrow peak 714. The second section 708 may have a first linear edge 716 that connects to the first slanting edge 710 via a first junction 720, and a second linear edge 718 that connects to the second slanting edge 712 via a second junction 722. The first section 706 and second section 708 may be a single continuous projection coupled to the base portion 704 having side edges 724.

As shown in FIG. 7, the first linear edge of the second section 708 may be positioned at a first angle 728 from the side edge 724. A second angle 730 may be formed between the side edge 724 of the projection 700 and an extension line 726, extending from the second junction 722. In a preferred embodiment of the projection 700, the first angle 728 may be smaller than the second angle 730. In further examples, the first angle 728 of the projection 700 may range from 100 degrees to 140 degrees, and the second angle 726 may range from 110 degrees to 170 degrees.

The second section 708 may have a height 732 smaller than a projection height 734. As an example, the height 732 may be 2.0 mm and projection height may be 3.0 mm. In other examples, the height 732 may range from 0.5 mm to 3.5 mm. In further examples, the projection height 734 may range from 1.0 mm to 5.0 mm.

A base width 736 of the elevated portion 702 of the projection 700 may range from 1.0 mm to 5.0 mm, for example. In other examples, the base width 736 of the elevated portion 702 may range from 3.0 mm to 5.0 mm. In alternative examples, the base width 736 of the elevated portion 702 of the projection 700 may be 3.0 mm or 4.0 mm or 5.0 mm. A threshold ratio of the projection height 734 to the base width 736 may range from 0.5 to 1.0, although other ranges may apply. The dimensions of the projection 700 may be selected based on type of assembly and material of the projection 700. For example, the projection 700 may be comprised of a material such as aluminum, aluminum alloys, iron, steel and other ferrous alloys. In this way, the elevated portion 702 of the projection 700 may have range of dimensions depending on type of assembly and material used for the projection 700 and degree of sealing required.

FIGS. 1A-7 show example configurations with relative positioning of the various components of a metal-to-metal seal. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

An example metal-to-metal sealing joint may comprise: a first mating surface and a second mating surface; wherein the first mating surface is provided with an annular projection having one or more annular grooves and wherein the projection is configured such that when the first and second surface are brought into mating contact, the annular projection of the first mating surface deforms the second mating surface to form a seal. In a preceding example, the first mating surface is fabricated from a harder material than the second mating surface. In any or all of the preceding examples, additionally or optionally, the first mating surface is a sintered part. In any or all of the preceding examples, additionally or optionally, the projection has a substantially triangular cross section. In any or all of the preceding examples, additionally or optionally, the triangular cross section of the projection is modified by a curved tip.

In further preceding examples, additionally or optionally, the annular groove is provided below the level of the first mating surface. In any or all of the preceding examples, additionally or optionally, the annular groove is provided above the level of the first mating surface. In any or all of the preceding examples, additionally or optionally, the projection has an asymmetric cross section. In any or all of the preceding examples, additionally or optionally, the projection has a height exceeding 1.0 mm. In any or all of the preceding examples, additionally or optionally, the first mating surface is fabricated from steel. In any or all of the preceding examples, additionally or optionally, the second mating surface is fabricated from aluminum.

Another example system may comprise: an engine ladder frame; and an oil pump coupled directly to and in face-sharing contact with the ladder frame via a metal-to-metal sealing joint, the joint having a first mating surface and a second mating surface; wherein the first mating surface is provided with an annular projection having one or more annular grooves and wherein the projection is shaped such that when the first and second mating surfaces are in mating contact, the annular projection of the first mating surface deforms the second mating surface to form the sealing joint.

In the preceding examples, additionally or optionally, the projection has a substantially triangular cross section. In any or all of the preceding examples, additionally or optionally, the triangular cross section of the projection is modified by a curved tip. In any or all of the preceding examples, additionally or optionally, the annular groove is offset from a level of the first mating surface. In any or all of the preceding examples, additionally or optionally, the projection has an asymmetric cross section. In any or all of the preceding examples, additionally or optionally, the first mating surface is steel and the second mating surface is aluminum. In any or all of the preceding examples, additionally or optionally, the projection has a height in a range of 1.0 mm to 5.0 mm.

An example system may comprise: an engine ladder frame; and an oil pump coupled directly to and in face-sharing contact with the ladder frame via a metal-to-metal sealing joint, the joint having a first mating surface and a second mating surface; wherein the first mating surface is provided with an annular projection having one or more annular grooves and wherein the projection is shaped such that when the first and second mating surfaces are in mating contact, the annular projection of the first mating surface deforms the second mating surface to form the sealing joint. In any or all of the preceding examples, additionally or optionally, the projection has a substantially triangular cross section. Furthermore, in any or all of the preceding examples, additionally or optionally, the triangular cross section of the projection is modified by a curved tip. In any or all of the preceding examples, additionally or optionally, the annular groove is offset from a level of the first mating surface. In any or all of the preceding examples, additionally or optionally, the projection has an asymmetric cross section. In any or all of the preceding examples, additionally or optionally, the projection has a height exceeding 1.0 mm. In any or all of the preceding examples, additionally or optionally, the projection has a height in a range of 1.0 mm to 5.0 mm. In any or all of the preceding examples, additionally or optionally, the first mating surface is steel. In any or all of the preceding examples, additionally or optionally, the second mating surface is aluminum.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A metal-to-metal sealing joint comprising a first mating surface and a second mating surface; wherein
the second mating surface comprises an annular projection extending outward from a base positioned at the second mating surface and one or more annular grooves; and
the annular projection deforms the first mating surface when the first and second mating surfaces are brought into mating contact, the deformation forming a second groove in the first mating surface to form the sealing joint.

2. The sealing joint according to claim 1, wherein the second mating surface is fabricated from a ferrous metal and the first mating surface is fabricated from a non-ferrous metal.

3. The sealing joint according to claim 2, wherein the annular projection is formed integrally with the second mating surface using sintering.

4. The sealing joint according to claim 1, wherein the annular projection has a substantially triangular cross section and the second groove has a corresponding triangular cross section.

5. The sealing joint according to claim 1, wherein the annular projection has a triangular cross section and a curved tip of the annular projection contacts the first mating surface.

6. The sealing joint according to claim 1, wherein the one or more annular grooves are provided below a level of the second mating surface and a deformed portion of the annular projection moves into the one or more annular grooves.

7. The sealing joint according to claim 1, wherein the annular projection has a height between 1.0-5.0 mm.

8. The sealing joint according to claim 1, wherein the first mating surface is fabricated from aluminum.

9. A system, comprising:
an engine ladder frame;
an oil pump coupled directly to and in face-sharing contact with the ladder frame via a metal-to-metal sealing joint, the sealing joint having a first mating surface and a second mating surface; and
the second mating surface comprising an annular projection extending outward from a base positioned at the second mating surface and one or more annular grooves; wherein
the annular projection deforms shape when the first and second mating surfaces are in mating contact, the annular projection of the second mating surface deforms the first mating surface forming a deformed groove, the deformation forming the sealing joint.

10. The system of claim 9, wherein the annular projection has a substantially triangular cross section prior to deformation.

11. The system of claim 10, wherein the triangular cross section of the annular projection comprises a curved tip in contact with the first mating surface.

12. The system of claim 9, wherein the annular groove is offset from a level of the second mating surface.

13. The system of claim 9, wherein the annular projection has a height in a range of 1.0 mm to 5.0 mm.

14. The system of claim 9, wherein the second mating surface is steel.

15. The system of claim 14, wherein the first mating surface is aluminum.

16. A sealing joint between two surfaces comprising:
a first mating surface and a second mating surface composed of metal;
the second mating surface comprising an annular projection comprising a base positioned at the second mating surface and the annular projection extending from the base away from the second mating surface;
the annular projection having a first cross section and a second cross section with a reduced height after a deformation by the first mating surface; and
a groove formed by the annular projection deforming the first mating surface.

17. The sealing joint of claim 16, wherein second mating surface grooves are positioned near a base of the annular projection and material displaced during the deformation of the annular projection moves into the second mating surface grooves.

18. The sealing joint of claim 17, wherein the annular projection has a triangular cross section prior to the deformation and a reduced height after the deformation.

19. The sealing joint of claim 18, wherein the groove has a cross sectional shape matching the annular projection after the deformation.

20. The sealing joint of claim 18, wherein the first mating surface has a flat surface prior to the deformation and includes the groove after the deformation by the annular projection.

* * * * *